(12) United States Patent
Lipton et al.

(10) Patent No.: US 8,736,672 B2
(45) Date of Patent: May 27, 2014

(54) ALGORITHMIC INTERAXIAL REDUCTION

(75) Inventors: Lenny Lipton, Los Angeles, CA (US); Robert Akka, Sausalito, CA (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 11/509,960

(22) Filed: Aug. 24, 2006

(65) Prior Publication Data

US 2008/0049100 A1    Feb. 28, 2008

(51) Int. Cl.
*H04N 13/02*    (2006.01)
*H04N 13/00*    (2006.01)

(52) U.S. Cl.
USPC ............................................. 348/47; 348/43

(58) Field of Classification Search
USPC .................. 348/42–48; 382/154; 345/427
See application file for complete search history.

(56) References Cited

U.S. PATENT DOCUMENTS

| | | | | |
|---|---|---|---|---|
| 2,990,759 | A * | 7/1961 | Marcosky | 396/324 |
| 3,574,295 | A * | 4/1971 | Tasaki | 396/326 |
| 4,557,570 | A * | 12/1985 | Hines | 396/325 |
| 4,650,305 | A * | 3/1987 | Hines | 396/325 |
| 5,063,441 | A * | 11/1991 | Lipton et al. | 348/47 |
| 5,416,510 | A * | 5/1995 | Lipton et al. | 348/43 |
| 5,424,773 | A * | 6/1995 | Saito | 348/218.1 |
| 5,646,679 | A * | 7/1997 | Yano et al. | 348/47 |
| 5,764,871 | A * | 6/1998 | Fogel | 345/427 |
| 5,765,871 | A | 6/1998 | Fogel | |
| 6,233,004 | B1 * | 5/2001 | Tanaka et al. | 348/48 |
| 6,346,965 | B1 * | 2/2002 | Toh | 348/49 |
| 6,366,281 | B1 * | 4/2002 | Lipton et al. | 345/419 |
| 6,384,859 | B1 * | 5/2002 | Matsumoto et al. | 348/43 |
| 6,385,334 | B1 * | 5/2002 | Saneyoshi et al. | 382/154 |
| 6,549,650 | B1 * | 4/2003 | Ishikawa et al. | 382/154 |
| 2003/0185421 | A1 * | 10/2003 | Okamoto et al. | 382/104 |
| 2004/0218809 | A1 * | 11/2004 | Blake et al. | 382/154 |

FOREIGN PATENT DOCUMENTS

EP    1085769 A2 *    3/2001    ............. G03B 13/02

OTHER PUBLICATIONS

Wattie, John. "Principles of stereoscopic photography using an ordinary camera". May 2, 2006. <http://nzphoto.tripod.com/starea/stereotake.htm>.*
Automatic software control of display parameters for stereoscopic graphics images Robert A. Akka, Proc. SPIE 1669, 31 (Jun. 1992).*
L. Zhang, D. Wang, & A. Vincent, "An Adaptive Object-Based Reconstruction of Intermediate Views from Stereoscopic Images", 3 Proc. of 2001 Int'l Conf. on Image Processing 923-26 (Oct. 2001).*
A. Colombari, A. Fusiello, & V. Murion, "Continuous Parallax Adjustment for 3D-TV", 2d IEEE Eur. Conf. on Visual Media Production (Dec. 2005).*

(Continued)

*Primary Examiner* — Dave Czekaj
*Assistant Examiner* — David N Werner
(74) *Attorney, Agent, or Firm* — Neil G. J. Mothew; Darlene K. Kondo (57) ABSTRACT

A system and method for determining an intermediate stereoscopic representation, thus offering adjustable interaxial separation values, is presented. The design comprises obtaining a first image using a first image collecting device and substantially simultaneously obtaining a second image using a second image collecting device. The two recoding devices are physically separated by a distance, and the second image may be combined with the first image to form a stereoscopic image. The design further determines the intermediate stereoscopic representation based on aspects of the first image combined, typically algorithmically, with aspects of the second image.

21 Claims, 4 Drawing Sheets

(56) References Cited

OTHER PUBLICATIONS

J. Konrad, "Enhancement of Viewer Comfort in Stereoscopic Viewing: Parallax Adjustment", 3639 Proc. SPIE 179-90 (May 1999).*

L. Lipton, "Foundations of the Stereoscopic Cinema: A Study in Depth" chs. 3, 6, appendices (1982).*

M. Agrawal, et al., "Window-Based Discontinuity Preserving Stereo," IEEE Conference on Computer Vision and Pattern Recognition (CVPR), Jun. 2004.

S. Birchfield, et al., "Depth Discontinuities by Pixel-to-Pixel Stereo," IEEE International Conference on Computer Vision (ICCV), Dec. 1999.

S. Birchfield, et al., "Multiway Cut for Stereo and Motion with Slanted Surfaces," CCV, Sep. 1999.

M. Bleyer, et al., "A Layered Stereo Algorithm Using Image Segmentation and Global Visibility Constraints," IEEE (ICIP), pp. 2997-3000, Oct. 2004.

Y. Boykov, et al., "Fast Approximate Energy Minimization Via Graph Cuts," IEEE (PAMI), vol. 23, No. 11, pp. 1222-1239, Nov. 2001.

A. Criminisi, et al., "Efficient Dense-Stereo and Novel-View Synthesis for Gaze Manipulation in One-to-One Teleconferencing," Microsoft Research Technicial Report, Sep. 2003.

A. Criminisi, et al., "Efficient Dense-Stereo with Occlusions and New View Synthesis by Four State DP for Gaze Correction," (IJVC), Jan. 2007.

Y. Deng, et al., "A Symmetric Patch-Based Correspondence Model for Occlusion Handling," ICCV, Oct. 2005.

S. Forstmann, et al., "Real-Time Stereo by Using Dynamic Programming," CVPR Workshop on Real-Time 3D Sensors and Their Use, Jun. 2004.

M. Gong, et al., "Multi-Baseline Stereo Matching Using Genetic Algorithm," CVPR Stereo Workshop, Dec. 2001.

M. Gong, et al., "Near Real-Time Reliable Stereo Matching Using Programmable Graphics Hardware," CVPR, Jun. 2005.

J.Y. Goulermas, et al., "A Collective-Based Adaptive Symbiotic Model for Surface Reconstruction in Area-Based Stereo," IEEE, vol. 7 (5), pp. 482-502, Oct. 2003.

H. Hirschmuller, "Improvements in Real-Time Correlation-Based Stereo Vision," CVPR Stereo Workshop, 2001; IJVC, Dec. 2001.

L. Hong, "Segment-Based Stereo Matching Using Graph Cuts," CVPR, Jun. 2004.

J.Y. Chang, et al., "Stereo Matching Using Iterated Graph Cuts and Mean Shift Filtering," Asian Conf. on Computer Vision (ACCV), Jun. 2006.

J.C. Kim, et al., "A Dense Stereo Matching Using Two-Pass Dynamic Programming with Generalized Ground Control Points," CVPR, Jun. 2005.

V. Kolmogorov, et al., "Computing Visual Correspondence with Occlusions Using Graph Cuts," ICCV, vol. 2, pp. 508-515, Jul. 2001.

V. Kolmogorov, et al., "Multi-Camera Scene Reconstruction Via Graph Cuts," Eurpoean Conference on Computer Vision (ECCV), May 2002.

S.H. Lee, et al., "Hierarchical Stochastic Diffusion for Disparity Estimation," CVPR Stereo Workshop, 2001; IJVC, Dec. 2002.

M.H. Lin, et al., "Surfaces with Occlusions from Layered Stereo," Ph.D. Thesis, Stanford University, Jun. 2003.

H. Mayer, "Analysis of Means to Improve Cooperative Disparity Estimation," Int'l Society for Photogrammetry and Remote Sensing (ISPRS), Sep. 2003.

K. Muhlmann, et al., "Calculating Dense Disparity Maps from Color Stereo Images, an Efficient Implementation," CVPR Stereo Workshop, 2001; IJCV, Apr. 2002.

S. Roy, et al., "A Maximum-Flow Formulation of the N-Camera Stereo Correspondence Problem," ICCV, Jan. 1998.

D. Scharstein, et al., "A Taxonomy and Evaluation of Dense Two-Frame Stereo Correspondence Algorithms," IJCV, pp. 7-42, vol. 47, No. 1-3, Apr. 2002.

J. Shao, "Combination of Stereo, Motion and Rendering for 3D Footage Display," CVPR Stereo Workshop, 2001; IJCV, Dec. 2001.

C. Sun, "Fast Stereo Matching Using Rectangular Subregioning and 3D Maximum-Surface Techniques," CVPR Stereo Workshop, 2001; IJCV, Apr. 2002.

J. Sun, et al., "Symmetric Stereo Matching for Occlusion Handling," CVPR, Jun. 2005.

J. Sun, et al., "Stereo Matching Using Belief Propagation," PAMI, pp. 787-800, vol. 25, Jul. 2003.

O. Veksler, "Fast Variable Window for Stereo Correspondence Using Integral Images," CVPR, Jun. 2003.

O. Veksler, "Stereo Correspondence by Dynamic Programming on a Tree," CVPR, Jun. 2005.

O, Veksler, "Stereo Matching by Compact Windows Via Minimum Ratio Cycle," ICCV, 2001, pp. 540-547, vol. 2, Jul. 2001.

Y. Wei, et al., "Region-Based Progressive Stereo Matching," CVPR, Jun. 2004.

K.J. Yoon et al., "Locally Adaptive Support-Weight Approach for Visual Correspondence Search," CVPR, Jun. 2005.

C. L. Zitnick, et al., "High-Quality Video View Interpolation Using a Layered Representation," ACM SIGGRAPH and ACM Trans. on Graphics, pp. 600-608, vol. 23, Issue 3, Aug. 2004.

Notification of Transmittal of International Preliminary Report on Patentability mailed Feb. 3, 2009 for PCT/US07/018430.

* cited by examiner

ALGORITHMIC INTERAXIAL REDUCTION

BACKGROUND OF THE INVENTION

1. Field of the Invention

The present invention relates generally to the field of motion picture cinematography, and more specifically to algorithmically reducing the interaxial separation for stereo-pair motion picture or video cinematography to produce lower parallax values.

2. Description of the Related Art

In stereoscopic cinematography, two planar cameras are employed to capture two perspective views, one for each eye. A stereoscopic camera has two camera heads—one for producing a left perspective, and the other for producing a right perspective. The strength or quality of the stereoscopic image is, to a large extent, determined by the separation of the two cameras, or the interaxial separation. The farther apart the camera heads, in other words, the greater their interaxial (distance between lens axes) separation, the stronger the stereoscopic effect. Conversely, the closer the camera heads, the weaker the stereoscopic effect.

In the art of stereoscopy, screen parallax is defined as a measure of the distance between left and right corresponding or homologous image points when such points are projected on a screen. It is usually important when shooting stereoscopic images to be sure that the maximum parallax values will, in a typical viewing configuration, not exceed a certain limiting value—namely the average or mean human interpupillary separation for background points. If the value of parallax is too great, discomfort is experienced because the user's eyes are forced to diverge, an experience that does not happen in the visual field when not observing a stereoscopic projected image. A principal way to control the value of parallax is through the adjustment of the camera's interaxial separation, t.

Adjustability of the interaxial separation enables the cinematographer to control the strength of the stereoscopic image. The proper interaxial value must be used to produce a natural-looking image, and the distance of the object from the cameras bears on the interaxial value and hence the quality of the image. One might suspect that stereoscopic photography ought to be done with an interaxial separation that is equal to the interpupillary separation, but this does not always produce the best results. Selecting the interpupillary separation may be a good starting point, but there are so many exceptions that this rule of thumb is frequently violated, and good quality viewing may be experienced when the cameras are closer or further apart than the interpupillary separation.

Thus adjustability of the camera rig can be highly beneficial. Rigs have been designed with different features. For example, one previous rig seeks to reduce the camera interaxial separation to approximate the human interpupillary distance. Such a design presents limitations with respect to the reduced interaxial separations that can be achieved. Another design shoots into or through a beam splitter or pellicle. This design results in a large rig generally unsuitable for many kinds of photography. In the case of both rigs, highly precise and time-consuming mechanical/optical alignment is required.

It would be beneficial to provide a stereoscopic photographic system and method that reduces or eliminates the interaxial separation and parallax problems associated with previous designs or camera rigs that offer adjustable interaxial separation values. Such a design may provide improved functionality over devices exhibiting those negative aspects described herein.

SUMMARY OF THE INVENTION

According to a first aspect of the present design, there is provided a method for determining an intermediate stereoscopic perspective representation. The method comprises obtaining a first image using a first image collecting device obtaining a second image using a second image collecting device. Some distance physically separates the two recoding devices, and the second image may be combined with the first image to form a stereoscopic image. The design further determines the intermediate stereoscopic perspective representation based on aspects of the first image combined with aspects of the second image.

According to a second aspect of the present design, there is provided an apparatus for creating an intermediate stereoscopic perspective representation of a plurality of stereoscopic images. The apparatus comprises a first image collecting device configured to record a first image and a second image collecting device separated by a distance from the first image collecting device and configured to record a second image. The second image is configured to be combined with the first image to form a stereoscopic image. The apparatus further comprises a processing device configured to compute the intermediate stereoscopic perspective representation based on the first image and the second image.

These and other aspects of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

The present discussion is not directed to describing stereoscopic display or viewing means, but rather is directed to discussion of a method to generally improve the results of image capture, or the ability for a computing or other electronic device to capture an image or images for viewing.

Stereoscopic cinematography (using either conventional photographic film or electronic image capture) requires two planar cameras to capture two perspective views, one for each eye. The reason for two planar cameras is the human viewer. Human beings see with the depth sense binocular stereopsis because they have two eyes that are approximately 2.5 inches apart. The eyes and the brain, to produce binocular stereopsis, combine these two slightly different perspective views of the visual world.

One difference between a planar viewing device, such as a camera, and a stereoscopic camera is that a stereoscopic camera has two camera heads—one for producing a left perspective, and the other for producing a right perspective. A camera with two camera heads is called a stereoscopic camera or rig, and it will be referred to herein in the singular. The strength of the stereoscopic image is, to a large extent, determined by the separation of the two cameras, or the interaxial separation. In the nomenclature of stereoscopy this quantity is usually represented as a lowercase and frequently italicized t. The farther apart the camera heads, in other words, the greater their interaxial separation, the stronger the stereoscopic effect. Conversely, the closer the camera heads, the weaker the stereoscopic effect.

Figure 6A:
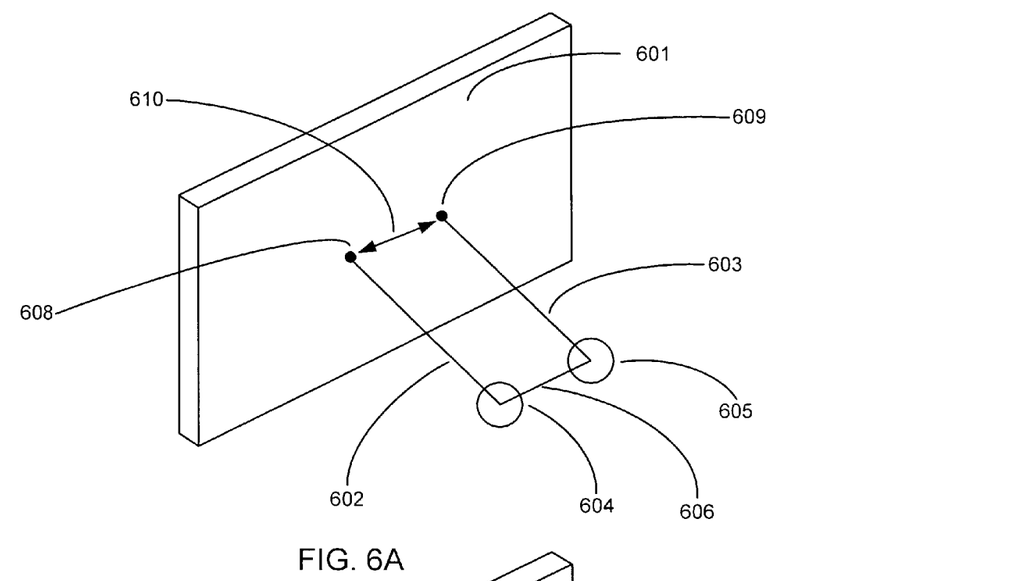
FIG. 6A is a diagrammatic illustration of the eyes of an observer looking at a stereoscopic projected motion picture image in which the corresponding points have a parallax value equal to the interpupillary separation.
Figure 6B:
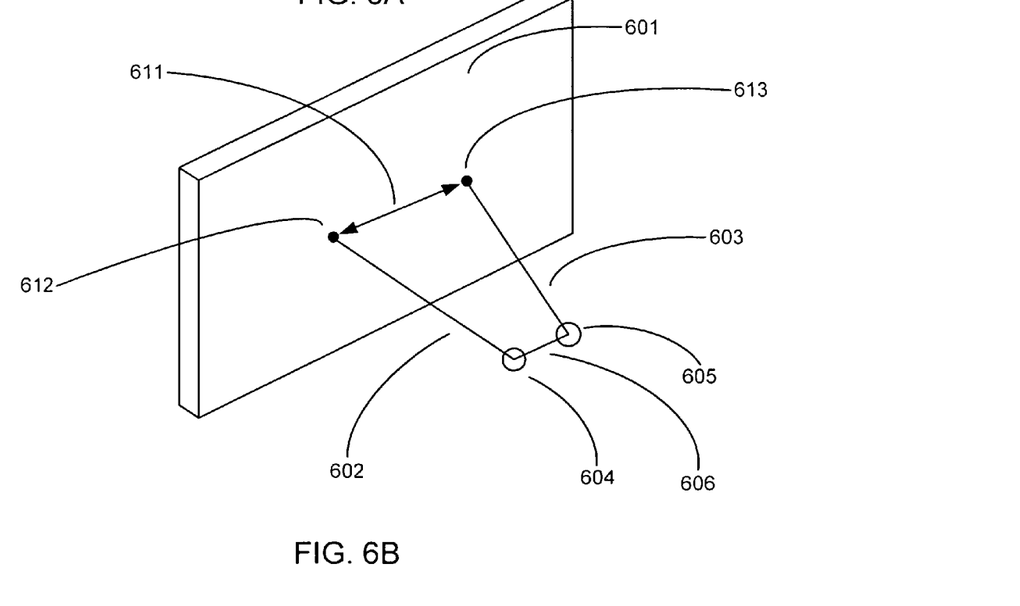
FIG. 6B is a schematic representation of a stereoscopic motion picture projected image in which the parallax value of the corresponding points is greater than the interpupillary separation.

In the art of stereoscopy, screen parallax is defined as a measure of the distance between left and right corresponding or homologous image points when such points are projected on a screen. If one laid a straight edge or ruler between the two points, the measured distance is defined as parallax. With reference to FIGS. 6A and 6B, the screen surface is 601, 604 and 605 are the left and right eyes, respectively, and the lens axes of the eyes are lines 602 and 603. The interpupillary separation is given by line 606.

FIG. 6A illustrates the case for non-divergent positive parallax in which the left and right homologous points, point 608 and point 609, respectively, are the parallax distance, which is equal to the interpupillary separation 606. This replicates the case of viewing an object at a great distance in the real world, or at stereo-optical infinity, because the lens axes of the eyes are parallel.

The distance between left and right image points, for positive parallax, normally ought not to exceed the interpupillary separation, or image viewing quality decreases. If the parallax values are greater than the interpupillary separation, the eyes are forced to diverge in order to fuse image points. This case is illustrated with the help of FIG. 6B in which parallax points 612 (left) and 613 (right) are separated by distance 611, where distance 611 is greater than the interpupillary separation 606. This condition is called divergence because the eye axes verge outward. Divergence does not occur in the visual world, and can lead to fatigue or eyestrain because of the unusual muscular exertion that is called for in order to fuse the homologous points.

Fusion is the process of bringing the corresponding points to the fovea centralis of the left and right retinae, respectively. The rotation of the eyes is called vergence. The inward rotation is called convergence, and inward rotation ordinarily occurs when viewing the visual world. The only time in the visual field that vergence is not convergence (or inward rotation) is when looking at objects at a very great distance, in which case the lens axes of the eyes are parallel. With respect to FIG. 6B, the lens axes of the eyes—if the parallax value is greater than the interpupillary separation—diverge. Divergence does not occur in the real world and is experienced by the majority of people as discomfort or eyestrain. Accordingly, the greater the value of divergent parallax, the more uncomfortable the viewing experience.

Therefore, it is important when shooting stereoscopic images to be sure that the maximum parallax values will not exceed a certain limiting value—namely the average or mean human interpupillary separation. If the value of parallax is too great, the viewer of the projected image experiences discomfort. A principal way to control the value of parallax is through the adjustment of the camera's interaxial separation, t.

Maximum screen parallax for background points is given by the equation for depth range, presented here in simplified form:

$$P_m = Mft/d_z \qquad (1)$$

$P_m$ is the maximum value of screen parallax, M is the projection linear magnification, f is the focal length employed by the camera during photography, t the interaxial separation, and $d_z$ is the distance from the camera to the plane of convergence or the zero parallax plane or point. $d_z$ is the distance for which objects have zero parallax. Equation (1) is, as stated, a special case of the depth range equation. This is because it is assumed that the background points are at some great distance from the camera. An additional term for distance (not shown) disappears from the denominator in the simplified version shown as Equation (1).

Comfortable viewing, wherein background points are non-divergent, can be achieved by means of controlling the focal length and interaxial separation at the time of photography rather than at the time of projection or post-photography. It is assumed that the choice of distance to the zero parallax plane $d_z$ is limited to a certain range since the object of principal interest is preferably at or near the plane of the screen. The magnification of the image is determined at the time of projection and is essentially out of the control of the cinematographer or graphic artists.

Since the appearance of the image(s) or look of the shot is, to a large extent, artistically controlled by the choice of focal length, which combined with changing the camera distance from the subject, controls the perspective of the objects, manipulation of the interaxial is the sole useful parameter for parallax control. But the interaxial is typically if not always the most difficult to control photographic parameter for live action photography because of design limitations of the camera rigs related to the width of the camera heads. The present design provides a means for reducing interaxial separation by algorithmic rather than by optical or mechanical means.

A measure that relates screen parallax to retinal disparity is parallax expressed as an angle. Retinal disparity is the relationship of corresponding points received at the left and right retinae. Expressing parallax as an angle enables relating the amount of divergence trigonometrically, or by angular measure. Conceptually, people sitting close to the screen experience greater divergence than people sitting farther away from the screen. Thus people sitting close to the screen may experience the most discomfort. This causes the stereoscopic cinematographer to remember the adage that he should be kind to the people in the front rows of the theater.

For objects close to the lens, which can be measured in feet or inches, it is frequently necessary to reduce the interaxial separation in order to produce a good looking picture, and one in which the background parallax points do not diverge. For objects that are further from the camera, departing from the interpupillary separation is preferred to achieve any kind of worthwhile stereoscopic effect.

Therefore, for reasons of viewing comfort and creative control, a general-purpose stereoscopic camera is preferably able to vary the interaxial separation. Thus a well-designed stereoscopic camera rig for general-purpose cinematography should have the ability to vary the interaxial separation from a small interaxial value to a large interaxial value. Typically for general-purpose cinematography, interaxial separation from about one inch to a foot will cover the vast majority of cases.

The ability to adjust cameras to vary the interaxial separation is quite beneficial. In the case of large interaxial separations, the cameras are positioned on a precision rail or optical positioning device typically employed with camera rig set-ups, and left and right perspective views can be captured appropriately. Difficulties arise in reducing the interaxial separation because the cameras cannot be brought any closer together than the width of a camera body. Providing both reduced and expanded interaxial separations present various challenges. Once the cinematographer varies the distance between the cameras, mechanical and optical tolerance issues must be addressed. Moving cameras makes keeping the lens axes in the same horizontal plane difficult, and maintaining the alignment is a primary requirement. Even a small tilt upward or downward of one axis produces a vertical parallax that will create divergence and eyestrain for the observers. In other words, if the projected corresponding image points don't line up so that a horizontal line can be passed through them—if one is higher than the other, there can be a great deal of visual discomfort. Many professional motion picture camera rigs, whether film or digital, require tweaking or calibration for each and every shot, and tweaking or calibrating cameras is a time consuming and therefore expensive undertaking.

For close-up photography, or photography for objects close to the camera, various kinds of rigs are available that can reduce interaxial separation by optical means. Such rigs are clumsy and awkward; they become large because of the optical systems involved, and because of the general bulkiness of having to arrange two cameras at awkward angles.

Previous Designs

It is instructive to look at two designs that reduce the effect of interaxial separation. The first design is presented in FIG. 1 and represents a previous type of camera rig. This device seeks to reduce the camera interaxial separation to at least approximate the human interpupillary distance. Two cameras make up the camera rig, cameras 101 and 107. The cameras have a separation or width 110 of a. The left camera has a lens 102, the right camera has lens 106. Both cameras and lenses face into an inverted V-shaped mirror ensemble made up of plane mirrors 104 and 105. Dotted lines 108 and 109 represent the left and right camera lens axes extended as reflected from the mirrors. $t_1$ is indicated as point 111, where $t_1$ is the effective interaxial separation and is less than camera width a.

Figure 1:
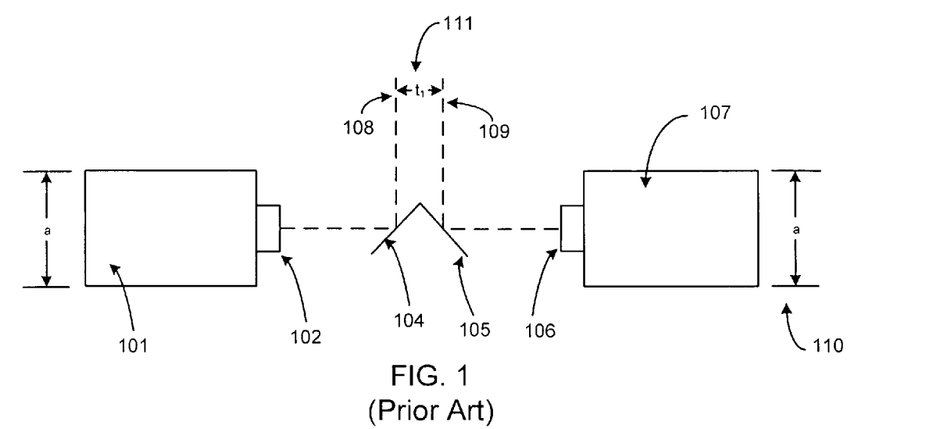
FIG. 1 shows a previous stereoscopic camera rig in which the cameras face each other and shoot into an inverted-V mirror set.

The arrangement here is one in which the two cameras produce an interaxial separation less than a, by shooting or filming using this inverted V mirror ensemble. One difficulty with a rig such as that shown in FIG. 1 is that the reduction in interaxial separation may need to be less than the interpupillary separation for close-up photography. Without this capability, close-up photography (photography of objects close to the camera) results in background homologous points extended beyond the interpupillary distance, thereby creating the divergent condition. Depth range Equation (1) shows that for close objects that are set at the zero parallax plane, $d_z$ approaches zero, and the maximum parallax points can rapidly increase to unacceptable values.

Figure 2:
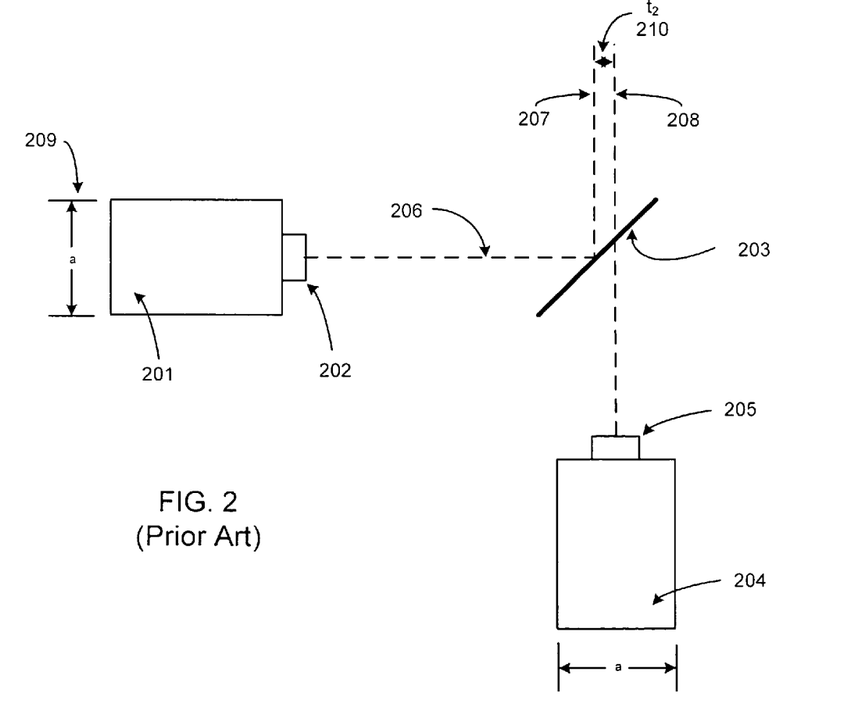
FIG. 2 is a previous camera rig in which the left and right cameras are at right angles to each other.

FIG. 2 shows a more complex rig using left camera 201 and right camera 204. The left and right cameras are of width a at point 209, and the left and right camera lenses are lenses 202 and 205 respectively. The cameras shoot into or through a beam splitter or pellicle 203. The beam splitter or pellicle 203 is a semi-silvered mirror that allows the right camera 204 to see directly through it, and the left camera 201 to see a reflected image off of the surface of the pellicle 203. The effective interaxial separation is made up of lens axis 206 (shown as 207 after reflection off the surface of the pellicle), as reflected by 203, in combination with axis 208 for lens 205 which sees directly through pellicle 203, and is given by $t_2$ at 210. The advantage of this rig over the previously described is that the interaxial separation may be varied as either camera is translated in a direction orthogonal to the lens axis. By this means $t_2$ 210 may be reduced to 0, or if desired, increased to some larger value.

In the case of both rigs (FIGS. 1 and 2), careful mechanical/optical alignment is required. In the first case, FIG. 1, there are limitations with regard to interaxial separation. In the second case of FIG. 2, the result is a large rig generally unsuitable for many kinds of photography, particularly in situations where a smaller camera is required, such as handheld camera photography.

Algorithmic Interaxial Design

The present design changes the interaxial separation without moving either of the two cameras employed in the rig. The design allows for an interaxial separation reduction that is less than the width of the camera, to facilitate close-ups (the face, or an object held in the hands, for example) or extreme close-ups. The design enables changing interaxial separation without moving cameras based on an algorithm or algorithms using a kind of image processing to extract or interpolate an intermediate perspective view. This process can take place either at the time of photography or during post-production.

The design presented, while discussed in the motion picture realm, may also be applied in scientific and medical imaging. It may be difficult to build a stereoscopic laparoscope, for example, in which the interaxial separation can be reduce to produce easy to view images with the appropriate depth content. In such as case the methodology described herein may be applied. Although this disclosure is not limited to digital photography, it is most preferably employed in conjunction with digital cameras that produce electronic files, because such files can be immediately processed in the field without a conversion from film to digital files, and in post-production such files are more conveniently handled. If stereoscopic photography originates on conventional photographic film, the images so photographed need to be converted to digital files to be processed according to these teachings.

According to the present design, the system receives two images from two cameras and interpolates an intermediate perspective view, as if a camera placed between the left and right cameras had captured the intermediate perspective view. This intermediate view can then provide, in conjunction with one of the original views, a stereo-pair having reduced interaxial separation. This reduced interaxial separation is employed to reduce the parallax values of corresponding distant points to prevent divergence when the images are viewed on a projection screen.

The interpolated image provides an intermediate view of appropriate perspective without the requirement that the cameras be moved or translated. The intermediate view, with an effective reduced interaxial separation, is derived algorithmically means. Scores of interpolation algorithms have been developed for many purposes over a number of years, and there is a substantial literature on the subject. No particular interpolation algorithm is favored over another in the present design, but it is to be understood that interpolation algorithms are employed to enable and calculate the intermediate view discussed herein.

By way of example but not by way of limitation, the following disclosures pertain to computational algorithms that may be employed to create the intermediate image discussed herein: M. Agrawal and L. Davis, "Window-Based Discontinuity Preserving Stereo," IEEE Conference on Computer Vision and Pattern Recognition (CVPR), 2004; S. Birchfield and C. Tomasi, "Depth Discontinuities by Pixel-to-Pixel Stereo," IEEE International Conference on Computer Vision (ICCV), 1998; S. Birchfield and C. Tomasi, "Multiway Cut for Stereo and Motion with Slanted Surfaces," ICCV, 1999; M. Bleyer and M. Gelautz, "Graph-Based Surface Reconstruction from Stereo Pairs Using Image Segmentation," Proceedings of the SPIE, vol. 5665, January 2005; M. Bleyer and M. Gelautz, "A Layered Stereo Algorithm Using Image Segmentation and Global Visibility Constraints," IEEE International Conference on Image Processing (ICIP), 2004, pp. 2997-3000; Y. Boykov, O. Veksler, and R. Zabih, "Fast Approximate Energy Minimization Via Graph Cuts," IEEE Transactions on Pattern Analysis and Machine Intelligence (PAMI), v. 23, no. 11, 2001, pp. 1222-1239; and R. Brockers, M. Hund, and B. Mertsching, "A Fast Cost Relaxation Stereo Algorithm with Occlusion Detection for Mobile Robot Applications," Proceedings of the Vision, Modeling, and Visualization Conference (VMV), 2004, pp. 47-53; R. Brockers, M. Hund, and B. Mertsching, "A Fast Cost Relaxation Stereo Algorithm with Occlusion Detection for Mobile Robot Applications," Proceedings of the Vision, Modeling, and Visualization Conference (VMV), 2004, pp. 47-53; A. Criminisi, J. Shotton, A. Blake, C. Rother, and P. H. S. Torr, "Efficient Dense-Stereo and Novel-View Synthesis for Gaze Manipulation in One-to-One Teleconferencing," Microsoft Research Technical Report MSR-TR-2003-59, September 2003; A. Criminisi, J. Shotton, A. Blake, C. Rother, and P. H. S. Torr, "Efficient Dense-Stereo with Occlusions and New View Synthesis by Four State DP for Gaze Correction," submitted to the International Journal of Computer Vision (IJCV), 2005; Y. Deng, Q. Yang, X. Lin, and X. Tang, "A Symmetric Patch-Based Correspondence Model for Occlusion Handling," ICCV, 2005; S. Forstmann, J. Ohya, Y. Kanou, A Schmitt, and S. Thuering, "Real-Time Stereo by Using Dynamic Programming," CVPR Workshop on Real-Time 3D Sensors and Their Use, 2004; M. Gong and Y.-H. Yang, "Multi-Baseline Stereo Matching Using Genetic Algorithm," CVPR Stereo Workshop, 2001; IJCV, 2002; M. Gong and Y.-H. Yang, "Near Real-Time Reliable Stereo Matching Using Programmable Graphics Hardware," CVPR, 2005; J. Y. Goulermas and P. Liatsis, "A Collective-Based Adaptive Symbiotic Model for Surface Reconstruction in Area-Based Stereo," IEEE Transactions on Evolutionary Computation, vol. 7 (5), pp. 482-502, 2003; H. Hirschmuller, "Improvements in Real-Time Correlation-Based Stereo Vision," CVPR Stereo Workshop, 2001; IJCV, 2002; L. Hong and G. Chen, "Segment-Based Stereo Matching Using Graph Cuts," CVPR, 2004; J. Jang, K. Lee, and S. Lee, "Stereo Matching Using Iterated Graph Cuts and Mean Shift Filtering," Asian Conference on Computer Vision (ACCV), January 2006; C. Kim, K. J. Lee, B. T. Choi, and S. U. Lee, "A Dense Stereo Matching Using Two-Pass Dynamic Programming with Generalized Ground Control Points," CVPR, 2005; V. Kolmogorov and R. Zabih, "Computing Visual Correspondence with Occlusions Using Graph Cuts," ICCV, v. 2, 2001, pp. 508-515; V. Kolmogorov and R. Zabih, "Multi-Camera Scene Reconstruction Via Graph Cuts," European Conference on Computer Vision (ECCV), May 2002; S. H. Lee, Y. Kanatsugu, and J.-I. Park, "Hierarchical Stochastic Diffusion for Disparity Estimation," CVPR Stereo Workshop, 2001; IJCV, 2002; M. Lin and C. Tomasi, "Surfaces with Occlusions from Layered Stereo," Ph.D. thesis, Stanford University, 2002; H. Mayer, "Analysis of Means to Improve Cooperative Disparity Estimation," International Society for Photogrammetry and Remote Sensing (ISPRS), Conference on Photogrammetric Image Analysis, 2003; K. Muhlmann, D. Maier, J. Hesser, and R. Manner, "Calculating Dense Disparity Maps from Color Stereo Images, an Efficient Implementation," CVPR Stereo Workshop, 2001; IJCV, 2002; S. Roy and I. J. Cox, "A Maximum-Flow Formulation of the N-Camera Stereo Correspondence Problem," ICCV, 1998; D. Scharstein and R. Szeliski, "A Taxonomy and Evaluation of Dense Two-Frame Stereo Correspondence Algorithms," IJCV, v. 47, no. 1-3, April-June 2002, pp. 7-42; Microsoft Research Technical Report MSR-TR-2001-81, November 2001; J. Shao, "Combination of Stereo, Motion and Rendering for 3D Footage Display," CVPR Stereo Workshop, 2001; IJCV, 2002; C. Sun, "Fast Stereo Matching Using Rectangular Subregioning and 3D Maximum-Surface Techniques," CVPR Stereo Workshop, 2001; IJCV, 2002; J. Sun, Y. Li, S. B. Kang, and H.-Y. Shum, "Symmetric Stereo Matching for Occlusion Handling," CVPR, 2005; J. Sun, H. Y. Shum, and N. N. Zheng, "Stereo Matching Using Belief Propagation," PAMI, v. 25, no. 7, July 2003, pp. 787-800; O. Veksler, "Fast Variable Window for Stereo Correspondence Using Integral Images," CVPR, 2003; O. Veksler, "Stereo Correspondence by Dynamic Programming on a Tree," CVPR, 2005; O. Veksler, "Stereo Matching by Compact Windows Via Minimum Ratio Cycle," ICCV, v. 2, 2001, pp. 540-547; Y. Wei and L. Quan, "Region-Based Progressive Stereo Matching," CVPR, 2004; K.-J. Yoon and I.-S. Kweon, "Locally Adaptive Support-Weight Approach for Visual Correspondence Search," CVPR, 2005; C. L. Zitnick, S. B. Kang, M. Uyttendaele, S. Winder, and R. Szeliski, "High-Quality Video View Interpolation Using a Layered Representation," ACM SIGGRAPH and ACM Transactions On Graphics, Vol. 23, Issue 3, pp. 600-608, August 2004. Again, various algorithms may be employed successfully in accordance with the teachings provided herein.

Figure 3:
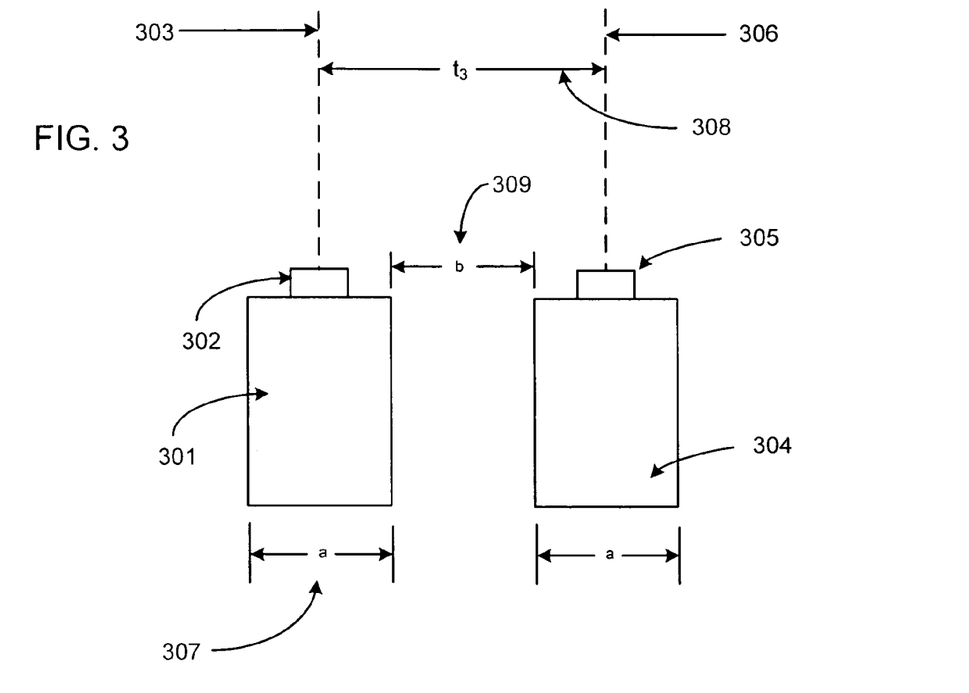
FIG. 3 is a simplified camera rig according to the teachings provided herein.

FIG. 3 shows left camera 301 and right camera 304, with left lens 302 and right lens 305. The width of the cameras shown at point 307 is given by dimension a. The separation between the facing inside surfaces of the cameras at point 309 is given by b. When b is zero, the cameras are as close together as possible and the minimum interaxial separation has been achieved. Dashed lines 303 and 306, respectively, represent the lens axes for the left and right cameras. Interaxial separation $t_3$ is shown at point 308.

Dimension b at point 309 can vary, but the cameras cannot be separated by a value where b is less than zero. In the case where b is equal to zero, the cameras are at their minimum physical interaxial separation. Such an arrangement may be employed in a handheld camera ensemble for photography from normal shooting distances in a room or set environment, but the requirement might then be, in many instances, to have an interaxial separation in which $t_3$ is less than distance a. The value of a in this situation may be too large for photography in which objects are close to the camera. On the other hand, when b is a large distance, eight or nine inches or more, then the instrument is relatively flexible. It is then not necessary to physically translate the cameras since the effective interaxial distance can be derived algorithmically. Large interaxial values are desirable for objects a great distance from the cameras since this is virtually the only way to create stereoscopic depth effects. The intermediate view can be derived algorithmically either in the field or in post-production to a desired value, such as less than $t_3$.

Figure 4:
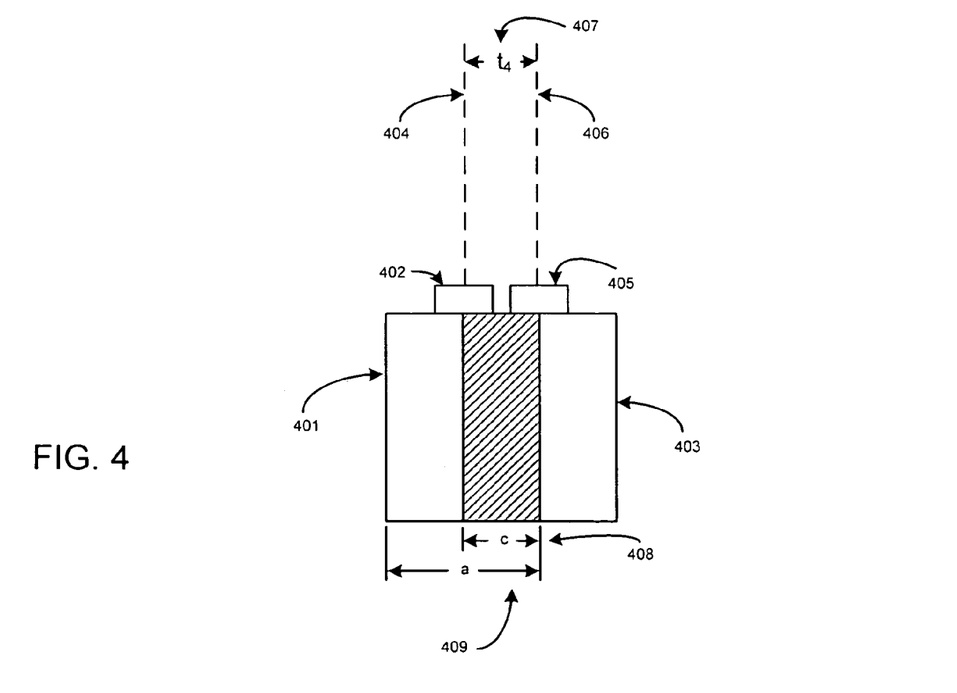
FIG. 4 shows a simplified rig using a virtual interaxial reduction as created algorithmically.

In FIG. 4 the same cameras as in FIG. 3 are shown. However, the cameras are in a "virtual" mode, and are now labeled left camera 401 and right camera 403. The width of the cameras remains at a. The left camera lens 402 and right camera lens 405 are shown, and the left and right lens axes 404 and 406 are also presented. Distance 407 represents the interaxial separation $t_4$. The crosshatched area denoted distance c and called out as region 408 indicates a virtual representation of what would occur if the two cameras could occupy the same space. As shown by region 408, the interaxial separation reduced by value c to be less than the width of the camera a, or to $t_4$. The resultant stereo-pair view can be derived algorithmically, with a process flow as given below.

A firmware version of the algorithmic derivation may be employed to derive the reduced stereo-pair at the time of photography—but because creative choices can be deferred and viewed more effectively, post-production processing may be preferred. In post-production different persons (cinematographer, director, etc.) have the option of varying the interaxial separation, and the ability to study at leisure which separation produces the best effect. By this means a number of different effective interaxial separations can be derived and evaluated based on judgment to determine what the final or "best" interaxial separation setting can be for a particular shot, scene, or image. In addition, the separation can be varied continuously to coordinate with variations in the zero parallax setting or to coordinate with zooming.

Figure 5:
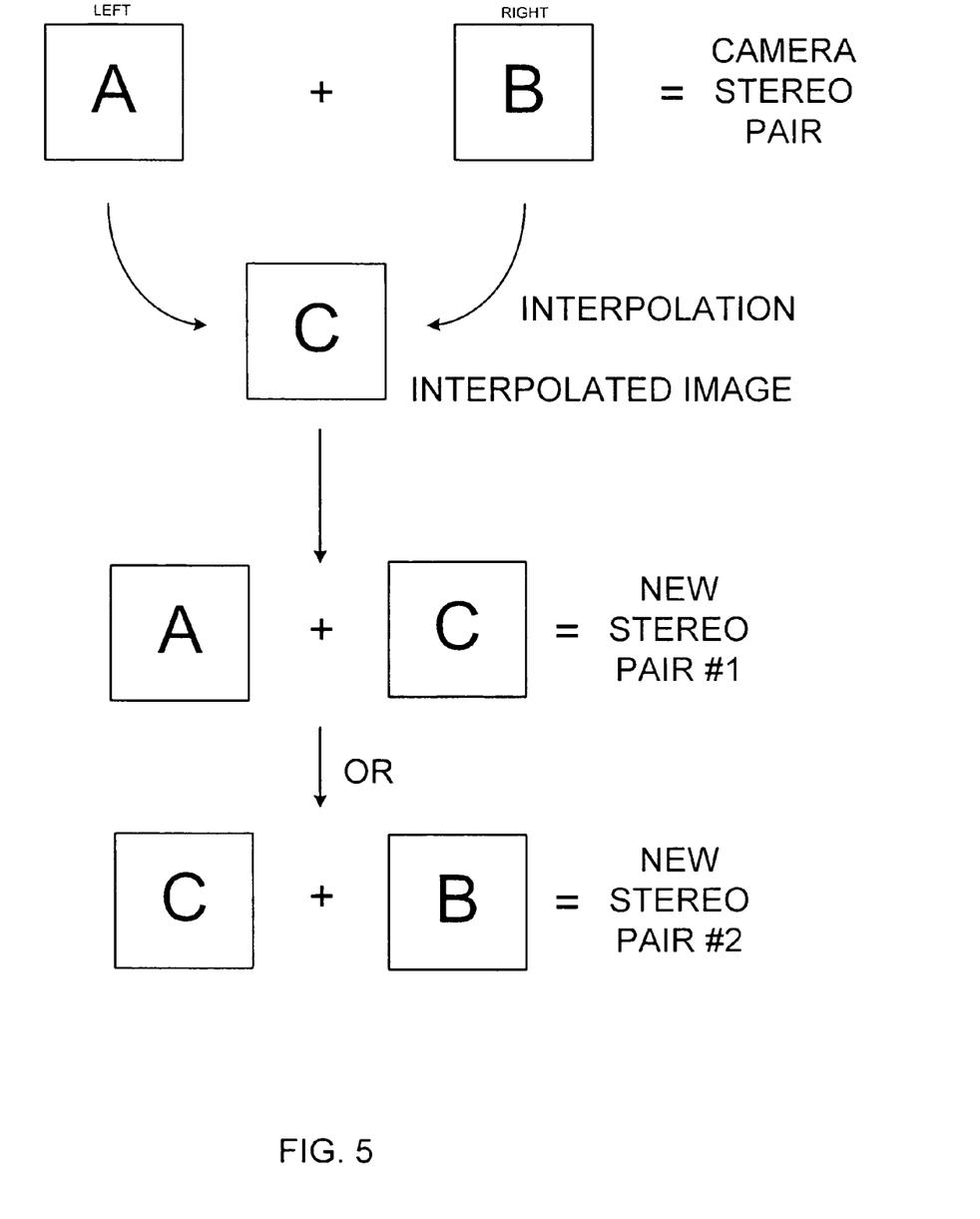
FIG. 5 shows the process flow using the interpolated image to provide a stereo-pair of reduced interaxial separation.

In FIG. 5 the work or the process flow is presented. Left and right images A and B form a camera stereo-pair. The images are derived at the time of original photography, using two cameras having an established physical separation. Interpolation between the two images A and B occurs so that view C is produced. View C represents a view, or camera position, at a specific but essentially any distance between the interaxial separation corresponding to views A and B. For example, C can be three-quarters of the way between A and B, halfway between A and B, or any value between the two views. This interpolation can be derived at the time of photography or it can be done in post-production, as previously mentioned. Interpolated image C can form a stereo-pair A+C to produce the new stereo-pair #1. Alternately, C+B produce new stereo-pair #2. Thus C may be coupled with original image A or original B, as long as the desired reduced interaxial effect has been achieved by the interpolation.

At the core of the interaxial processing is the interpolation function. By interpolation, different algorithms or methods may be employed, but the simplest would be a straight linear intermediate image formation on a pixel by pixel basis. Per this algorithm, any given image position is represented by a Pixel X, comprising red, green, and blue subpixel elements. R, G, and B represent the intensities of those subpixels, respectively; these values are typically described on a scale of 0 (minimum intensity) to 255 (maximum intensity). At pixel position X, Image A, representing the left image, has subpixel values ($R_a$, $G_a$, $B_a$), while (at the same pixel position) Image B, representing the right image, has subpixel values ($R_b$, $G_b$, $B_b$). A simple linear interpolation algorithm may be employed to calculate intermediate values for those subpixels. Where the intermediate image is intended to represent a view position that is portion n of the way from the left-camera view to the right-camera view, the intermediate image for pixel X would be represented by ($R_n$, $G_n$, $B_n$)

$$R_n = (R_a*(1-n)) + (R_b*n) \quad (2)$$

$$G_n = (G_a*(1-n)) + (G_b*n) \quad (3)$$

$$B_n = (B_a*(1-n)) + (B_b*n) \quad (4)$$

For example, if n=0.33, meaning that an intermediate image is desired that is 33% of the way between the left camera representation and the right camera representation, and if Pixel X in Image A has RGB values (96, 128, 96), while Pixel X in Image B has RGB values (224, 0, 32), Pixel X in the intermediate image would have RGB values that are 33% of the way from Image A values to Image B values:

$$R_n = (96*(0.67)) + (224*0.33) = 138 \quad (5)$$

$$G_n = (128*(0.67)) + (0*0.33) = 86 \quad (6)$$

$$B_n = (96*(0.67)) + (32*0.33) = 75 \quad (7)$$

This is an extremely simple example. Non linear interpolation, processing for movement or blurring, or other applicable stereoscopic interpolation techniques may be employed, and other optical parameters, including but not limited to luminance and chrominance may be employed. Also, digital linear pixel values may be employed and rounding or truncation may be employed. For example, if the left image has a red pixel Y that is on (1) and the right image has a red pixel Y that is off (0), and the pixel can only be on or off, an intermediate image desired to be 75 per cent toward the left image may result in the intermediate pixel Y being on (1).

The design uses interpolation, or the foregoing algorithmic process or processes, to create images having different interaxial separations with a standard or fixed interaxial distance between the two source cameras. Using the foregoing, interaxial separation can be reduced either at the time of photography or in post-production so that an interpolated or intermediate view can be used to derive, in conjunction with either the original left or right image, a new stereo-pair. The new stereo-pair has, in effect, a reduced interaxial separation compared with the physically set rig interaxial. Such a reduced interaxial separation is effective for eliminating divergence of background homologous points upon projection, or can be used to vary the interaxial separation even continuously, if required, in order to obviate camera head translation and thereby eliminate calibration setup which is costly and time-consuming. Such an algorithmically derived reduction in interaxial may also be used to achieve an aesthetically desirable result that would not be otherwise possible given the limitations of the camera rig.

It is furthermore possible that more sophisticated algorithms for determining intermediate views based on a stereo pair image source, algorithms that are not well described by the term "interpolation", may be employed, resulting in a camera system that can produce stereo pairs of varying effective separation (less than or equaling the actual physical camera separation), while potentially offering better quality than sole use of a relatively simple interpolation algorithm.

The approach that follows is an example of a more sophisticated algorithm that might be used for calculating an intermediate view based on two stereo pair element views. The first phase of this alternate approach is to identify and match points in each of the two stereo pair elements corresponding to the same point on a three-dimensional object in the scene. For example, if the scene contains a house with a door, and the door is visible in each of the stereo pair elements, the middle of the doorknob would be represented by a particular pixel location in each stereo pair element. Due to the likelihood that the door does not reside at exactly zero-parallax, the doorknob point would be expected to be represented by different pixel locations in each of the two stereo pair images. This point-matching phase of the alternate algorithm might be accomplished using edge-detection image processing operations, by applying an algorithm that finds pixel patterns that approximately match one another, or by a combination of image processing or other methods. Such methods might be scan-line based, others might attempt to traverse prominent features of an edge-mapped representation of the scene, or other methods may be used. It is also possible that some scene points are represented in one original stereo image but not the other, and the algorithm would deal with that. However, in most cases, the stereo pair elements should have enough in common that most major scene features will appear with corresponding points in each of the two stereo pair images.

Once the above algorithm phase has derived a mapping of image points, that mapping, along with pixel data from each of the source images, can be utilized to assemble an intermediate stereo view. For any given scene element represented by corresponding points mapped by the point-matching phase of the alternate algorithm, some horizontal offset will indicate the parallax setting of that scene element. That horizontal offset might be a positive number (indicating what is known as positive parallax), zero (indicating zero parallax), or a negative number (negative parallax). For an intermediate view, the amount of parallax offset to applied to any given scene element may be determined based on the full parallax offset for that particular scene element in the two original stereo pairs as well as the view position of the desired intermediate view.

Where the intermediate image is intended to represent a view position that is portion n of the way from the left-camera view to the right-camera view, and where the full parallax offset amount for a particular scene element is P, the parallax offset amount for the scene element in the new view, relative to the left-eye view, would simply be (n*P). For example, if the doorknob in the scene has a parallax offset, between the left-eye and the right-eye views, of 15 pixels, and an intermediate image is 33% of the way between the left-eye and the right-eye view is desired, the doorknob appears in the intermediate stereo image with a parallax offset of 15*0.33, or 5 pixels, relative to the appearance of that feature in the left-eye view. If n is greater than 50%, making that intermediate view closer to the right-eye view, it may be better to calculate the intermediate parallax offset relative to the right-eye view, which would be (1−n)*(−P).

There are a number of different approaches for assembling an intermediate image that conform to the assortment of parallax offsets calculated above for the intermediate view representation of the scene. One of the simpler approaches is to apply a "morph" operation to one or both of the original images, based on the various offsets that need to be applied to different parts of the image. Some parts of the image may need to be stretched or compressed in order to apply all of the mapped offsets, while keeping the textural continuity of the image generally intact. Other more complex approaches may utilize the morph function for some parts of the image, while offsetting entire sections of the image intact and without distortion, and may for example clip out other sections of the image in the process. The most sophisticated of these methods would effectively simulate a change of viewpoint, in which some scene elements encounter a slight change of perspective, while others are occluded.

The present descriptions assume exactly two physical cameras in the stereo camera rig, and that interpolation (or other calculation) to obtain intermediate views is based on the source images from those two cameras. The stereo camera may include more than two actual cameras, and as optics and sensors get smaller, stereo camera rigs incorporating numerous camera devices may become common. It may nevertheless be useful for such a multi-camera stereo rig to utilize interpolation or other algorithmic calculation to derive intermediate views between the views of specific camera elements in a multi-camera environment.

While the invention has been described above by reference to certain embodiments, it will be understood that changes and modifications may be made without departing from the scope of the invention, which is to be defined only by the appended claims and their equivalents. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method for creating an intermediate stereoscopic perspective representation of a plurality of stereoscopic images, comprising:
    obtaining a first image collected using a first image collecting device;
    obtaining a second image collected using a second image collecting device, the second image collecting device spaced apart from the first image collecting device by an original interaxial separation distance, said second image configured to be combined with the first image to form a stereoscopic image;
    determining whether a new stereo pair having a new interaxial separation distance less than a minimum physical interaxial separation distance between the first and second image collecting devices is desired;
    computing the intermediate stereoscopic perspective representation based on data from the first and second images; and
    generating the new stereo pair comprising
        the intermediate stereoscopic perspective representation, and
        one of the first image and second image;
    wherein vertical axes of the first and second image collecting devices are offset by the original interaxial separation distance, and wherein vertical axes of the new stereo pair are offset by the new interaxial separation distance, the new interaxial separation distance being less than a minimum physical interaxial separation distance between the first and second image collecting devices.

2. The method of claim 1, wherein said determining comprises performing an algorithm to combine the first image with the second image.

3. The method of claim 2, wherein the algorithm comprises an interpolation algorithm.

4. The method of claim 1, wherein the first image collecting device and the second image collecting device have substantially parallel image recording axes.

5. The method of claim 2, wherein said algorithm comprises a nonlinear algorithm.

6. The method of claim 4, wherein the intermediate stereoscopic perspective representation represents a combination of images along an imaginary line joining a first device image recording axis and a second device image recording axis.

7. The method of claim 1, wherein the first image and second image are obtained substantially simultaneously.

8. An apparatus for creating an intermediate stereoscopic perspective representation of a plurality of stereoscopic images, comprising:
    an image collecting device configured to obtain a first image and a second image, the second image comprising an image collected by a second image collecting device physically separated from a first image collecting device that collected the first image by an original interaxial separation distance such that vertical axes of the first and second image collecting devices are offset by the original interaxial separation distance, said second image configured to be combined with the first image to form a stereoscopic image; and a processing device configured to determine whether a new stereo pair having a new interaxial separation distance less than a minimum physical interaxial separation distance between the first and second image collecting devices is desired, configured to compute the intermediate stereoscopic perspective representation based on data from the first and second images, and configured to generate the new stereo pair comprising the intermediate stereoscopic perspective representation, and one of the first image and second image, the new stereo pair having the new interaxial separation distance that is less than a minimum physical interaxial separation distance between the first and second image collecting devices.

9. The apparatus of claim 8, wherein the processing device is configured to perform an algorithm to combine the first image with the second image.

10. The apparatus of claim 9, wherein the algorithm comprises an interpolation algorithm.

11. The apparatus of claim 8, wherein the first image collecting device and the second image collecting device have substantially parallel image recording axes.

12. The apparatus of claim 9, wherein said algorithm comprises a nonlinear algorithm.

13. The apparatus of claim 11, wherein the intermediate stereoscopic perspective representation represents a combination of images along an imaginary line joining a first device image recording axis and a second device image recording axis.

14. The apparatus of claim 8, wherein the first image collecting device and the second image collecting device are in communication with the processing device and the output of the processing device is a plurality of intermediate images.

15. A method of processing stereoscopic images, comprising:

obtaining a plurality of first images and a plurality of second images originally collected by image collecting devices each separated from another image collecting device by an original interaxial separation distance such that vertical axes of the plurality of first images and the plurality of second images are offset by the original interaxial separation distance;

determining whether new stereo pairs having a new interaxial separation distance less than a minimum physical interaxial separation distance between the first and second image collecting devices are desired; and computing an intermediate stereoscopic perspective representation based on data from the plurality of first images and the plurality of second images; and generating a plurality of the new stereo pairs comprising:
the intermediate stereoscopic perspective representation, and one image of the plurality of first and second images, the plurality of new stereo pairs having the new interaxial separation distances that are less than a minimum physical interaxial separation between the first and second image collecting devices.

16. The method of claim 15, wherein said computing comprises performing a pixel combining algorithm to combine selected pixels from a first image received from one image collecting device with selected pixels from a second image received from a second image collecting device.

17. The method of claim 16, wherein the pixel combining algorithm comprises an interpolation algorithm.

18. The method of claim 15, wherein all image collecting devices have substantially parallel image recording axes.

19. The method of claim 16, wherein said pixel combining algorithm comprises a nonlinear algorithm.

20. The method of claim 18, wherein the intermediate stereoscopic perspective representation represents a combination of images along an imaginary line joining at least a first device image recording axis and a second device image recording axis.

21. The method of claim 15, wherein images are received by the image collecting devices substantially simultaneously.

* * * * *